United States Patent [19]

Lutz et al.

[11] Patent Number: 5,666,265

[45] Date of Patent: Sep. 9, 1997

[54] PORTABLE WORKSTATION HOUSING

[76] Inventors: Ron E Lutz, Box 237, Bragg Creek, Alberta, Canada, T0L 0K0; Leonard D Healy, 4224-15 St. S.W., Calgary, Alberta, Canada, T2T 4A9

[21] Appl. No.: 667,409

[22] Filed: Jun. 21, 1996

[51] Int. Cl.$^6$ ............................ H05K 5/00; H05K 7/16
[52] U.S. Cl. ............................ 361/683; 206/320
[58] Field of Search .................. 220/334, 335; 190/1, 10, 11, 106; 206/320; 361/683, 724, 726, 679; 364/708.1

[56] References Cited

U.S. PATENT DOCUMENTS

| | | | |
|---|---|---|---|
| 4,896,776 | 1/1990 | Kabanuk et al. | 206/576 |
| 5,105,338 | 4/1992 | Held | 361/391 |
| 5,115,893 | 5/1992 | Terkildsen | 190/11 |
| 5,163,560 | 11/1992 | Parrish | 206/576 |
| 5,177,665 | 1/1993 | Frank | 361/380 |
| 5,214,574 | 5/1993 | Chang | 361/393 |
| 5,217,119 | 6/1993 | Hollingsworth | 206/583 |
| 5,226,540 | 7/1993 | Bradbury | 206/576 |
| 5,232,276 | 8/1993 | Martin | 312/208.4 |
| 5,242,056 | 9/1993 | Zia | 206/576 |
| 5,267,123 | 11/1993 | Boothroyd | 361/680 |
| 5,325,970 | 7/1994 | Dillon | 206/576 |
| 5,437,367 | 8/1995 | Martin | 206/320 |
| 5,445,266 | 8/1995 | Prete | 206/320 |

*Primary Examiner*—Bot L. Ledynh
*Assistant Examiner*—Lynn D. Feild
*Attorney, Agent, or Firm*—David S. Thompson

[57] ABSTRACT

In its closed configuration, a portable workstation housing resembles a closed attache case. A lid, having opposed sidewalls and a top, and a planar base, having little or no peripheral lip, are separated by a narrow spine. The lid pivots through a range of up to 180 degrees relative to the base and upper portion of the spine. A lid support element is pivotable between a first position flush to the housing and a second position perpendicular to the lid which supports the weight of the lid when fully open. The base supports a portable computer by means of releasable fasteners. A fastener having a first sex of VELCRO is attached by adhesive to the bottom of the computer and a fastener having a second sex of VELCRO is attached to the base, allowing the computer to be held in place for use and transit. Similarly, a printer, disk drives, modems, ac-converters and other peripherals are held in place. A printer is typically carried by the lid. Elongate VELCRO cord wraps, having a covering of a first sex of VELCRO on one side and a second sex of VELCRO on the opposite side are attached and one end to the housing, and are used to wrap and organize the many power and data cords. A power strip, having a power cord that is retractable into a spool, is carried within the portable workstation housing and provides power to the computer and all peripherals.

14 Claims, 5 Drawing Sheets

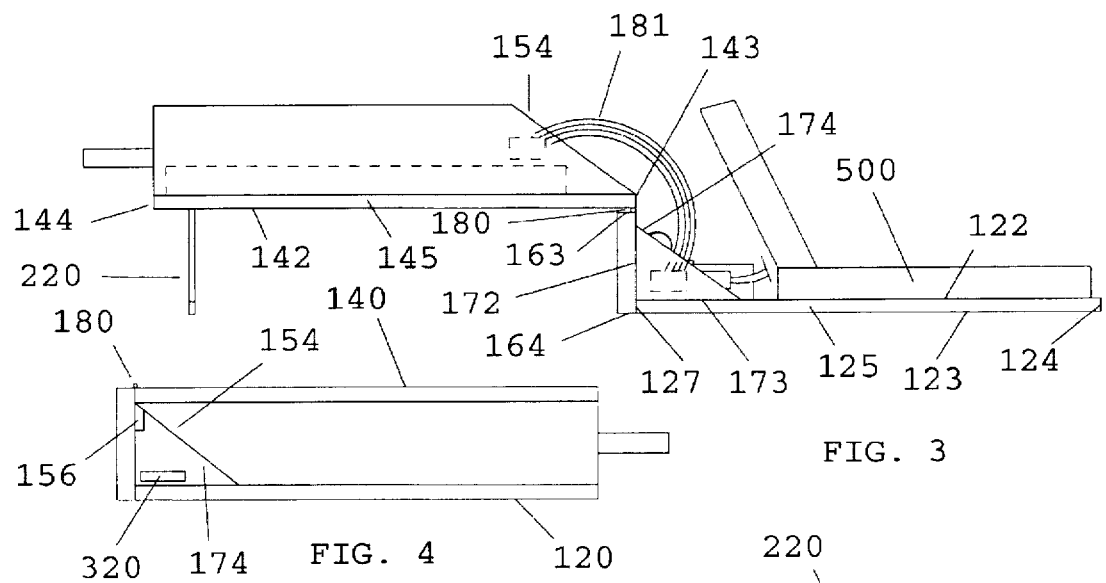
FIG. 3
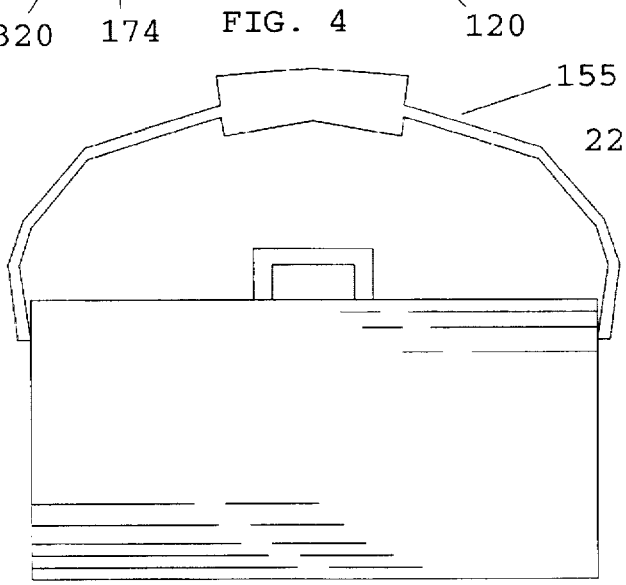
FIG. 4
FIG. 5
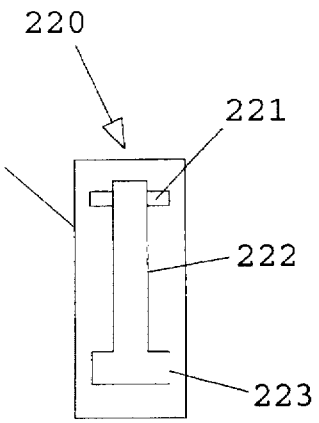
FIG. 6

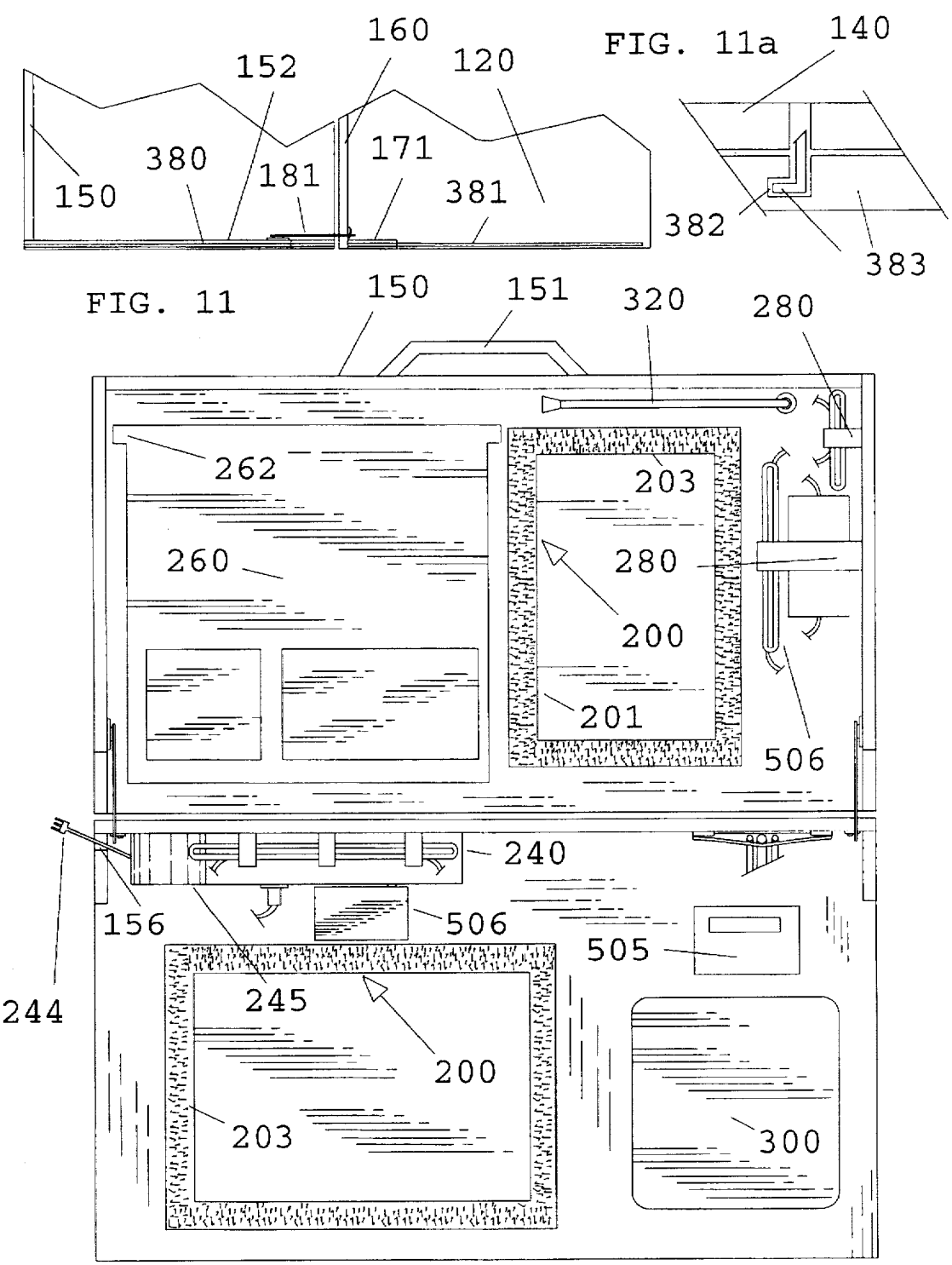

PORTABLE WORKSTATION HOUSING

CROSS-REFERENCES

There are no applications related to this application filed in this or any foreign country.

BACKGROUND

As a result of the recent technological developments, notebook and lap-top computers have become truly portable. However, to provide a truly portable work environment, a user requires a portable computer having a number of peripheral items, such as a printer, data/fax modem and cellular phone, AC current adapters, a power strip having a surge suppressor, and a number of data and power cables to connect together the various portable components. Without these peripheral devices, the user would not have the ability to perform many tasks. Without the power and data cables interconnecting the peripheral devices, the user would have to spend a great deal of time setting up and disassembling the work station before and after use.

To provide the user with a truly portable, fully functional work environment, a portable workstation housing is required. The portable workstation housing must protect, organize and house the various necessary elements in a manner that allows the user to efficiently operate the computer while contained within the housing. Several previous housings have attempted to fill the needs of the user. Unfortunately, several problems still exist.

Known portable computer housings have failed to adequately provide the structures required to allow the user to conveniently bundle together unneeded cable length in a safe and organized manner. Known computer housings have failed to provide the structures needed by users to releasably attach computer and peripheral equipment and devices to the housing in a customizable and re-arrangeable manner that prevents unwanted movement of the attached devices beth in use and in travel. Moreover, known portable computer housings have failed to provide a power cord that is suitable for plugging into an AC wall outlet that is variable in length and that retracts into an enclosed spool after use. Known computer housings have failed to provide dual work surfaces having different elevations; in particular, a lower work surface to support a computer and an upper Work surface that is raised several inches above the lower work surface to provide an easily accessible and viewable location for a peripheral device. Known computer housings have also failed to provide means to adjust the elevation of the computer within the computer housing. Known computer housing have failed to provide protection against theft; in particular, they have failed to employ Kensington®-type slots which could be used to anchor the housing. Known computer housings have failed to provide a structure consistent with the need to charge batteries over an extended period of time, and the need to leave the computer housing unattended yet protected during that time. Additionally, known computer housings have failed to provide a lid in a pivoting relationship to a base having a stiff hinge or locking means to enable the user to open and fix the lid at any angle, where it will remain fixed until released and moved again.

SUMMARY

The present invention is directed to an apparatus that satisfies the above needs by providing a portable workstation housing that supports, protects, electrically charges and organizes a portable computer, associated peripheral equipment and devices and data and power cables. Alternatively, the workstation housing of the invention may house a electronic or other typewriter and fax machine, or other work equipment. The portable workstation housing of the invention allows the user to store, electrically charge and use the computer while in the housing.

A preferred version of the portable workstation housing of the present invention provides:

(a) A base providing a substantially flat work surface for supporting a portable computer. The preferred version of the base has little or no lip, and therefore allows the user complete assess to the keyboard and sides of the computer, which may provide expansion slots or disk drive access.

(b) A spine is attached at right angles to the rear edge of the base in a rigid manner. In a preferred version, the spine and base are rigidly formed of a unitary piece of rugged plastic. In an optional embodiment, two typically triangular spine braces, one attached to each end of the spine and also to the base, maintain the dignity of the spine-to-base connection.

(c) A lid, providing two opposed sidewalls and a connecting perpendicular top surface having a handle, carries a computer peripheral, such as a printer. When fully opened by movement through 180 degrees from the base, the lid provides a second work surface elevated above the base by a distance equal to the width of the spine.

(d) A hinge, typically a piano hinge, allows the lid to pivot with respect to the spine and attached base. In a preferred version, the hinge is stiff and will stay in a partly open position unattended, due to friction. Alternatively, left and right locking means, carried by the opposed sidewalls and by the spine braces, provide a structure capable of freezing the movement of the lid on the hinge, allowing user to release the lid, where it will be maintained, at any angle between 0 and 180 degrees.

(e) Positioning means for holding the computer, printer and other components or devices in place without slipping, sliding or falling is provided. Typically, these positioning means comprise VELCRO strips having adhesive on one side and a first or second sex of VELCRO fastener on the other side. In a typical application, VELCRO strips having male (hook) VELCRO are applied by means of adhesive backing to the base and lid in a pattern appropriate to support the computer, printer, and other devices. A similar pattern of VELCRO strips having female (loop) VELCRO is then applied to the undersides of the computer, printer and other devices by means of the adhesive backing. The computer and peripherals are then releasably fixed to the computer housing by mating the VELCRO strips.

(f) Cable organizing means, typically comprising elongate VELCRO wraps are attached at one end to the base, spine or lid. Each VELCRO wrap provides a first sex of VELCRO on one side and a second sex of VELCRO on the other side. By encircling a coiled or folded cable or wire, the wraps promote safety and organization by maintaining the coiled or folded cable configuration.

(g) A mouse pad is carried on the base by means of two-sided tape or adhesive in a position adjacent to the computer. The mouse pad may be oriented for either left- or right-handed use by the user when the portable workstation housing is configured.

(h) A power strip is typically carried by the spine, but may be carried in alternative locations by means of the above described positioning means. The power strip typically provides a plurality of outlets, a surge suppressor, on-off switch and a power indicator light. A power cord is mounted on a retracting spool, allowing the cord to be withdrawn from the spool to plug into a wall outlet, thereby transferring power to the power strip and allowing the equipment of the customizable portable workstation housing to be charged when the housing is closed. After use, the power cord may be recoiled into the spool, where it is conveniently stored.

(i) A battery powered snake light, typically mounted on the lid, allows users to concentrate light where it is needed.

(j) A lid support device, carried by the lid, prevents the entire portable workstation housing from tipping when the weight of the printer and associated paper exceeds the weight of the computer. The lid support device is typically a center mounted leg that snaps from a first position flush with the lid, to a second, supporting, position perpendicular to the lid.

(k) Optionally, the computer housing provides a Kensington® security slot and a locking mechanism to prevent the case from being opened. Therefore, the entire case and its contents could be protected by using just one Kensington® or similar security device and cable.

(l) A vertically adjustable computer support surface provides a scissor type mechanism which allows the user to adjust the elevation of the support surface. The surface is fully lowered prior to storage or transport, and then is easily raised for convenient use. The vertically adjustable computer support surface allows the user to adjust the height of the computer to compensate for an undesirable work location.

(m) A file pocket adjusts between a smaller size suitable for letter sized files and a larger size suitable for legal sized files. VELCRO supports the file pocket on the inside of the lid.

It is therefore a primary advantage of the present invention to provide a novel portable workstation housing that provides adjustable positioning means to hold in place a computer, a printer or other peripheral device, data and power cables, and other devices in a manner that may be altered to conform to the exact dimensions of the items carried by the housing, and that may be altered to the preferences of a left- or right-handed user.

Another advantage of the present invention is to provide a portable workstation housing that provides a power strip having the advantages of multiple electrical outlets, an on-off switch, a surge suppressor and an electric power cord that extends to the desired length and retracts about an enclosed spool by means of a spring-loaded mechanism.

Another advantage of the present invention is to provide a portable workstation housing that provides a battery operated snake light built into the case, typically on the lid, thereby providing an adjustable light source.

Another advantage of the present invention is to provide a portable workstation housing that provides an alarm that will sound if the housing is broken into, and that provides protection against theft and vandalism for the computer and peripherals.

Another advantage of the present invention is to provide a portable workstation housing that provides structures that will allow the user to charge batteries while the portable workstation housing is closed and locked.

Another advantage of the present invention is to provide a portable workstation housing that allows the interconnecting cables between components to be left attached when the housing is closed and moved to a new location.

Another advantage of the present invention is to provide a portable workstation housing that provides a vertically adjustable computer support surface for adjusting the vertical altitude of the computer.

Another advantage of the present invention is to provide a portable workstation housing that provides cable organizing means for wrapping the extra length of the power and data cables in a manner that ensures organization and safety.

Another advantage of the present invention is to provide a portable workstation housing that provides a lid that may be opened to any angle between 0 and 180 degrees, having a hinge that is stiff enough to allow the lid to be maintained in that angle, or that provides locking means that allows the user to lock the lid at any angle.

A still further advantage of the present invention is to provide a portable workstation housing that provides a lid support, for use where the lid is opened to 180 degrees, to prevent the case from tipping.

DRAWINGS

These and other features, aspects, and advantages of the present invention will become better understood with regard to the following description, appended claims, and accompanying drawings where:

FIG. 3 is a side isometric view of the portable workstation housing of FIG. 1, having the lid fully opened and the lid support element in its extended position;

FIG. 4 is a side isometric view of the portable workstation housing of FIG. 1, having the lid fully closed;

FIG. 5 is a front isometric view of the portable workstation housing of FIG. 4;

FIG. 6 is an enlarged view of the lid support element in its closed position;

FIG. 11 is a top view of the lid, spine and base, showing the tongue and groove structure that may be used;

FIG. 11a is a cross-sectional view of the tongue and groove structure of FIG. 11, showing an optional locking mechanism;

FIG. 12 is a top view of the computer housing two computer components removed, showing the VELCRO positioning elements attached to the computer housing;

DESCRIPTION

Figures 1, 2:
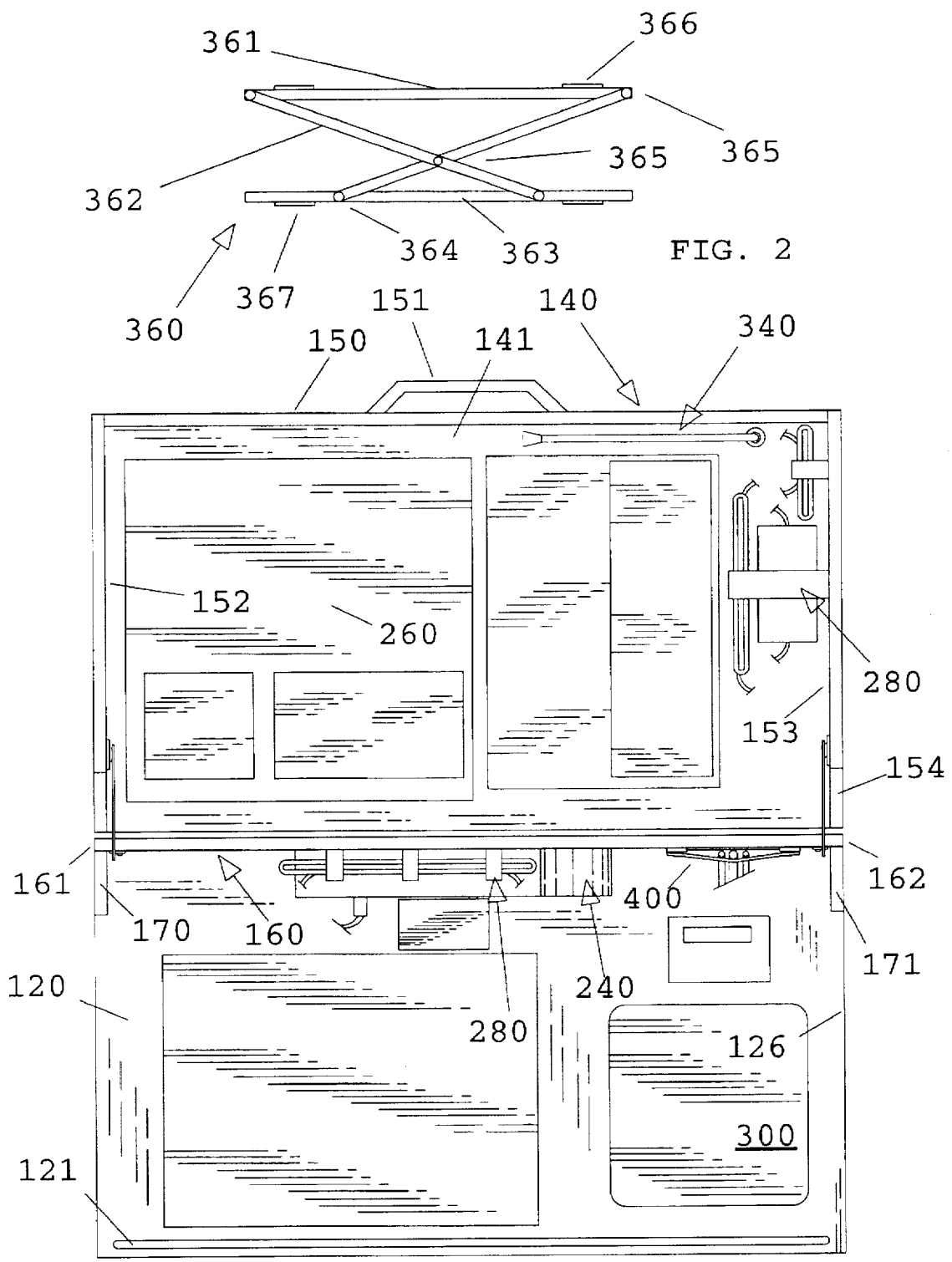
FIG. 1 is a top plan view of a version of the invention configured for a right-handed user, having an optional calculator installed and having a file pocket.
FIG. 2 is a side view of a vertically adjustable computer support surface having a scissor-like height adjustment mechanism.

In its closed configuration, a portable workstation housing 100 resembles a closed attache case. In the preferred embodiment, the portable workstation housing provides support and adaptation for a computer, printer and other peripherals. In secondary embodiments, the workstation housing is compatible with electronic typewriters and faxes, or personal digital assistants, or still alternatively, with paper and pen. Referring to the figures, a lid 140, carries opposed sidewalls 152, 153 and a top 150. A planar base 120, having little or no peripheral lip, carries a narrow spine 160, which is rigidly attached in a perpendicular relationship to the base by means of left and right spine braces 170, 171. The lid 140 pivots on a hinge 180 that is attached to the top edge 163 of the spine 160 through a range of up to 180 degrees relative to the base 120. A lid support element 220, pivotable between a first position flush to the housing and a second position perpendicular to the lid, supports the weight of the lid when fully open. The base and lid support portable computer components such as a computer, printer, disk drive, modem or ac-converter by means of positioning elements 200. A positioning element having a first sex of VELCRO is attached by adhesive to the bottom of the each computer component. Similarly, a positioning element having a second sex of VELCRO is attached to the base or lid by adhesive, allowing the component to be held in place both during use and transit by mating the VELCRO surfaces. Elongate VELCRO cord wraps 280, having a covering of a first sex of VELCRO on one side and a second sex of VELCRO on the opposite side, are attached at one end to the housing, and are used to wrap and organize the many power and data cords. A snake light 340 provides the user with lighting, as needed. Thus positioned by positioning elements 200 and cord wraps 280, the computer and peripherals may remain hooked up and ready to go, once the portable workstation housing is opened. A power strip 240, having a power cord 244 that is retractable into a spool 245, is carried within the portable workstation housing and provides power to the computer and all peripherals.

Referring in particular to FIGS. 1 and 3, a portable workstation housing constructed in accordance with the principles of the invention is seen. In the preferred embodiment, the base 120 is a planar surface, and is typically made of rigid plastic or other suitable material. The dimensions of the base tend to be determined by the dimensions of the computer and computer peripherals to be carried, but in a preferred version a width of 60 cm and a depth of 33 cm is used.

The base provides an inside surface 122, which supports the computer components, and an outside surface 123. The inside surface may provide a pencil groove 121 near the front edge 124. The front edge and left and right side edges 125, 126 are typically free of any sidewall or lip. This provides access to the PCMCIA slots or disk drives the computer may have on its side, and also allows the user to type without reaching over a wall or lip structure. As a result, the computer housing of the invention is adapted for use in supporting computer equipment while the computer equipment is in actual use. A rear edge 127 supports the spine 160.

A spine 160 is mounted perpendicularly to the base 120, along rear edge 127. The spine is an elongate planar surface having a length equal to the width of the base, typically about 60 cm. The width of the spine depends on the height of the computer components to be housed, but is typically 3 to 5 inches. A top edge 163 carries a hinge 180 which allows the lid to pivot with respect to the spine. The bottom edge 164 is attached to the rear edge 127 of the base 120. Left and right edges 161, 162 are attached to spine braces 170, 171.

As seen in FIGS. 1 and 3, left and right spine braces 170, 171 increase the strength of the connection between the spine 160 and the base 120. In the embodiment seen in FIG. 3, the back edge 172 is typically shorter than the width of the spine by an amount equal to the thickness of the lid. The bottom edge 173 is typically approximately the same length as the back edge. An angled edge 174 generally slopes at an angle of 30 to 60 degrees with respect to the base.

In the preferred embodiment, the base 120, spine 160 and spine braces 170, 171 could all be molded of a single piece of plastic. If sufficiently strong, the spine braces would not be needed. Similarly, the lid 260, sides 151, 152, and the top 150 could also be mounded in a single piece.

As seen in FIGS. 1 and 3, a planar lid 140 having dimensions similar to the base is pivotally carried by means of a hinge on the top edge of the spine. In the preferred embodiment the lid is somewhat thinner than the base, since it will tend to be somewhat less stressed, and has the sidewalls 152, 153 to strengthen it. The lid may be pivoted over a range of 180 degrees, from a closed position as seen in FIG. 4 to a fully open position seen in FIG. 1. In the fully opened position, a seated user may easily see over the case, allowing for interaction with others while using the portable workstation. The lid provides an inner surface 141 and an outer surface 142. An upper edge 144 carries a perpendicularly oriented top 150. The top is planar, having a length equal to the width of the lid and a width equal to the width of the spine. A handle 151 is attached to the center of the top. A left edge 145 of the lid carries a left sidewall 152, while a right edge 146 carries a right sidewall 153. Each sidewall has an angled edge 154 to mate with the angled edge of the spine brace. Each sidewall has a width equal to the width of the top and spine, and a length when combined with the spine braces equal to the depth of the base and lid. A lower edge 143 carries a hinge 180, allowing the lid to pivot with respect to the spine and base. As seen in FIG. 12, in a preferred version of the invention, a slot 156 in one or both sidewalls 152, 153 or spine braces 170, 171 allows the power cord to exit the housing even when the housing is closed and locked, thereby allowing the user to charge batteries while the workstation housing is unattended and secured by means of the Kensington® slot and cable.

Referring to FIG. 11, in the preferred embodiment, the lid and base are connected when closed by a tongue and groove. The lid provides a tongue 380, while the base provides a groove 381. Additionally, as seen in FIG. 11a, the base may provide a lock hollow 382 where a locking device 383 supported by the top or sides could be engaged.

A shoulder strap 155 may be attached to the computer housing, typically to the sidewalls of the lid.

In a preferred version of the invention, an elongate piano hinge 180 is used to allow the lid to pivot with respect to the base and spine. In a first embodiment of the invention, a piano hinge having low frictional characteristics is combined with locking means to allow pivoting and to prevent unwanted movement of the hinge when the lid is partially open. The locking means comprises left and right arc-shaped locking elements 181. Each locking element provides an elongate arc having a medial slot, carried by one half of the housing. The slot frames a bolt carried by the other half of the housing. As the user adjusts the position of the lid, the arc moves against the bolt. Once adjusted, the user tightens a knurled knob or butterfly nut on the bolt, thereby holding the lid in a fixed position relative to the base. When the knob or nut is loosened, the lid may be readjusted or closed. As a result, the user may open the lid partially, and the locking elements may be used to prevent further movement due to the weight of the lid.

An alternative version of the invention provides a shaft-type hinge or stiff piano hinge that is similar in structure to the hinge structures common to many lap-top and portable computers. This type of hinge is inherently somewhat frictional, and typically often does not require the arc-shaped locking elements to keep the lid from rotating after it is positioned by the user.

Other versions of the invention employ alternative structures to prevent unwanted movement about the hinge between the lid and the base. A listing of such structures is unnecessary, since structural solutions to this narrow problem are well documented by the prior art. One such solution would involve the use of a notched cam, which would provide incrementally variable, rather than continuously or infinitely variable, adjustment. Using such a structure, the user could select the proper adjustment by choosing between 10 degree increments.

Figure 15:
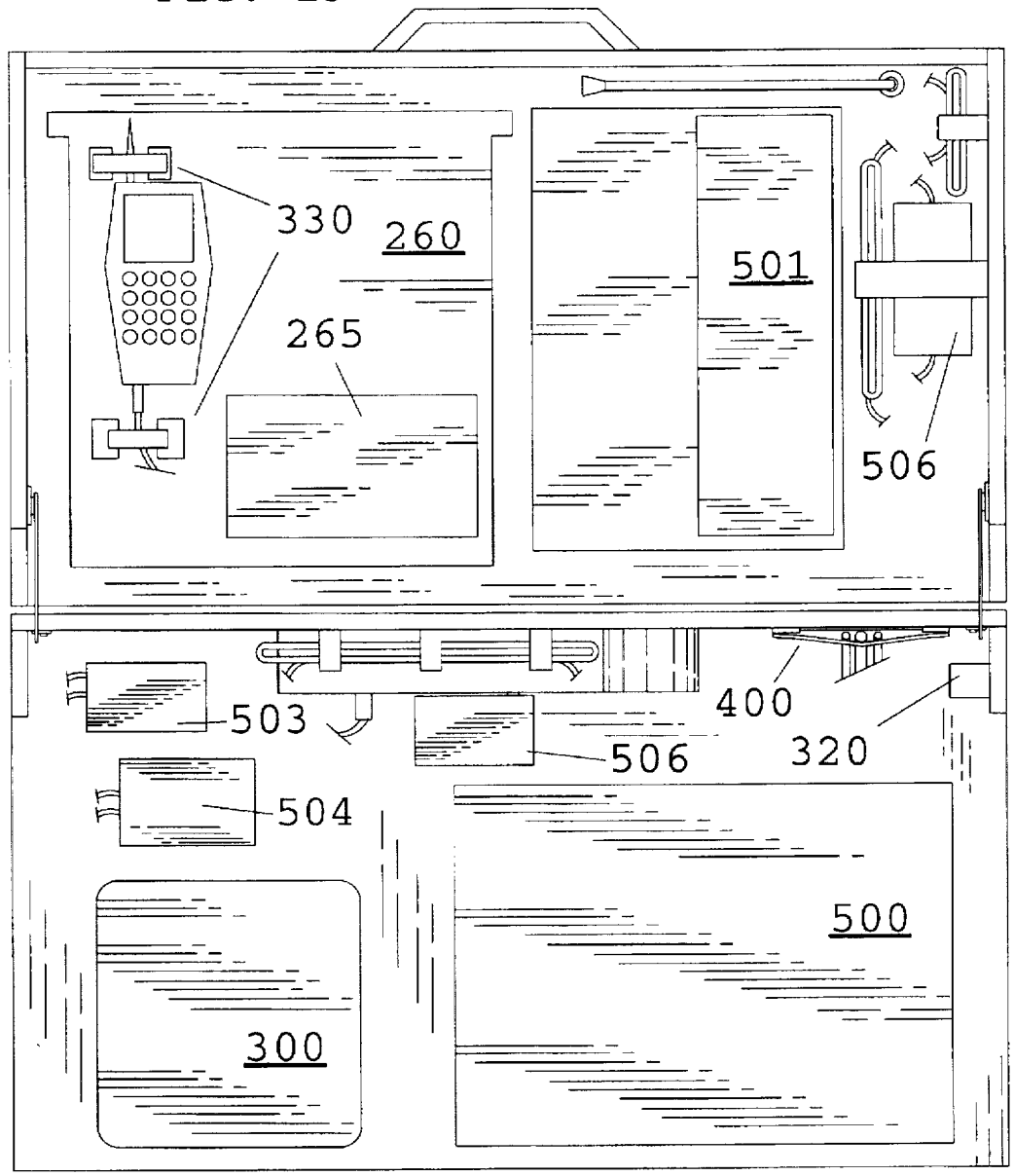
FIG. 15 is a top plan view of a second version of the invention configured for a left-handed user.

To prevent the computer housing from tipping when fully opened, a lid support 220 is provided, which maintains the lid in a level manner above a table or other work surface. The lid support is pivotable from a first position flush with the lid, to a second supporting position perpendicular to the lid, as seen in FIG. 3. As seen in FIG. 6, the lid support provides a base 224 that attaches to the outer surface 142 of the lid 140. The base carries a hinge 221 that allows the leg 222 having a foot 22:3 to rotate. When the leg is oriented perpendicular to the base it supports the base; as seen in FIG. 3. The leg is oriented parallel to the base for transport. As seen in FIGS. 1, 12 and 15, a mouse pad 300 is carried by the upper surface of the base by means of double sided tape, glue or other fastening means. The mouse pad may be carried to the left or right of the computer, to accommodate left- or right-handed users.

Figures 7A, 7B:
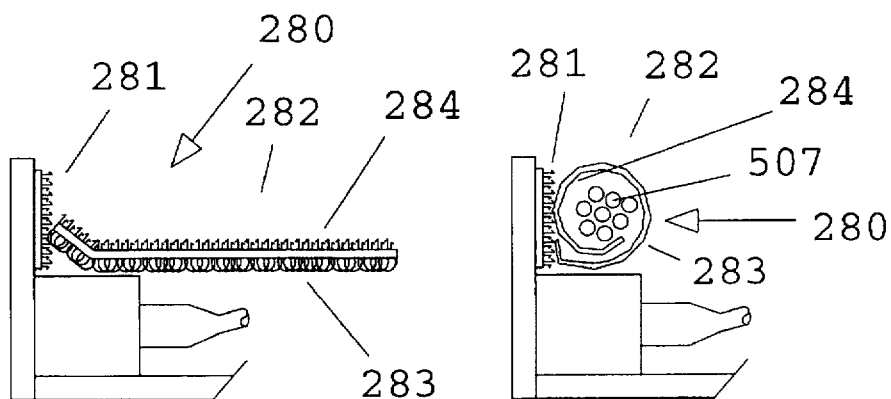
FIG. 7a is an enlarged side view of the spine of the housing, a portion of the base, the end of the power strip and a cord wrap fully extended, ready for use, and showing the VELCRO in a somewhat enlarged manner.
FIG. 7b is an enlarged side view of the spine of the housing, a portion of the base, the end of the power strip and a cord wrap, coiled as it would be in use.
Figure 8:
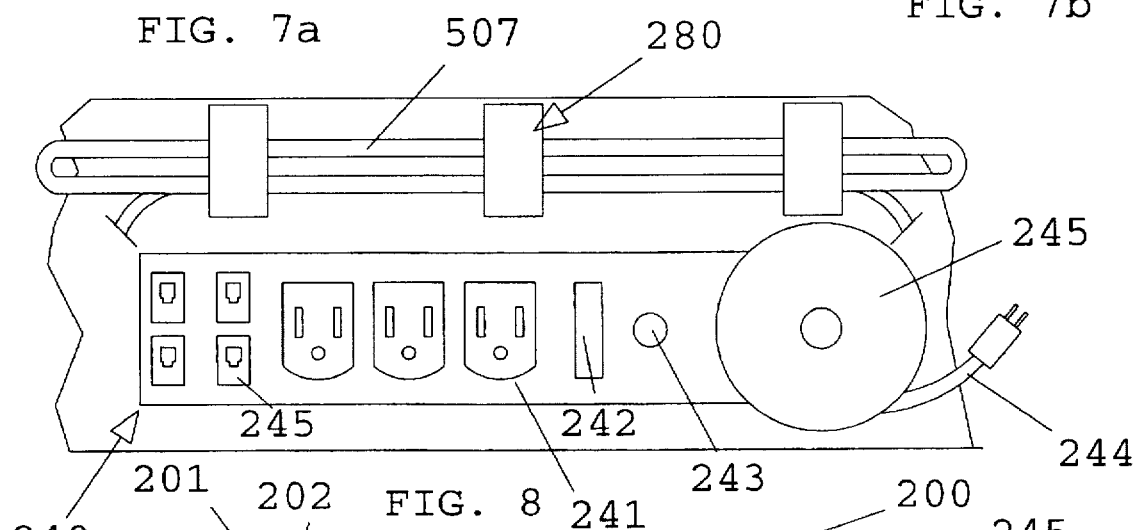
FIG. 8 is a view of the front of the power strip, also showing three cord wraps.
Figure 9:
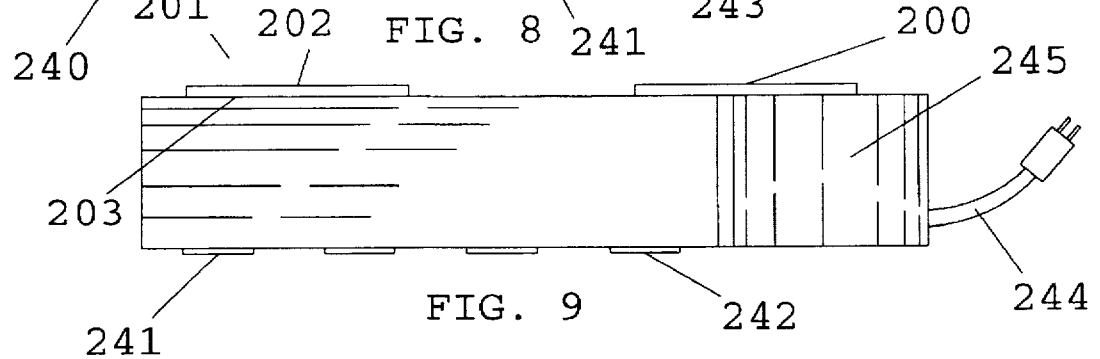
FIG. 9 is a side view of the power strip of FIG. 8.

As seen in FIGS. 1 and 7-9, a power strip 240 having an internal surge suppressor is provided. In the preferred embodiment, the power strip is positionable by means of VELCRO positioning elements ZOO, as will be seen below. In an alternative embodiment, the power strip is rigidly attached to the spine, as seen in FIGS. 1, 12 and 15 and provides a plurality of outlets 241. If the power strip is rigidly attached to the spine of the workstation housing, a recessed area on the outside portion of the spine brace may be provided to house the plug of the power cord used to attach to external power. Such a recessed area would prevent the cord from catching on things during transport, and would allow the cord to be accessed for battery charging while the case is locked. The power strip typically provides a switch 242 and an indicator light 243. As seen in FIGS. 7 and 8, a spring powered spool device 245 is attached to the power strip. The power cord 244 may be extended against the spring to a desired length and retracted by the spring when not needed. In one embodiment of the invention, the power strip additionally provides multiple interconnected telephone jacks 246. Wiring internal to the power strip would connect the several jacks. Such an arrangement is advantageous, since it allows the length of wire from the power strip to the modem and telephone to be precisely chosen, and allows the user to connect a telephone line to only the power strip, thereby providing a telephone connection going to the modem and a telephone connection going to the telephone, and/or any other device.

As seen in FIG. 4, an opening 147 for a power cord 244 allows the computer to be plugged in while it is locked, which allows the user to charge the computers batteries while simultaneously providing security for the computer and peripherals.

Figure 10:
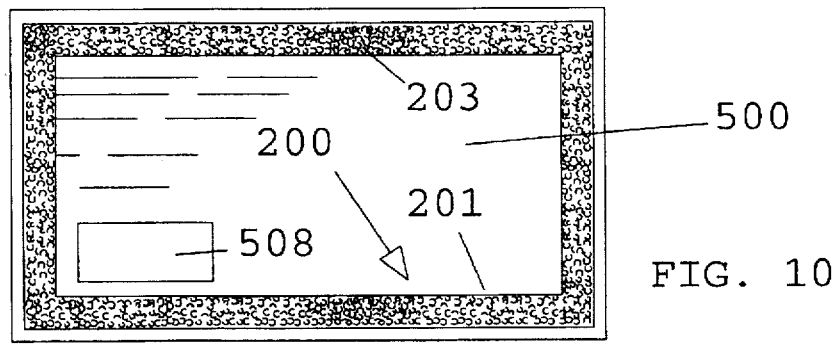
FIG. 10 is a bottom view of a computer having the VELCRO positioning elements installed.

As seen by a comparison of FIGS. 1, 12 and 15, the portable computer 500, printer 501, external CD ROM drive 502, external modem 503, and external hard disk drive 504 and any other peripheral components, including ac power converters 506 and the ac power strip, may be supported on the inner surfaces of the lid, spine or base by means of positioning elements 200. A calculator 505 may optionally be installed by either two-sided tape, VELCRO positioning elements or other fastening means. In the preferred embodiment, the positioning elements include similarly sized male fastener strips 201 and female fastener strips 204. The male fastening strips provide an adhesive covered side that is protected before use by a peel-off backing. An opposite side provides male a VELCRO covering 203. Similarly, the female fastening strips provide an adhesive covered side that is protected before use by a peel-off backing. An opposite side provides female a VELCRO covering 206. In both cases, the adhesive is chosen so that it allows the later removal, if desired, without damage, of the positioning elements 200 for reinstallation. Using the male and female fasteners, the user may secure any computer component to the computer housing. FIG. 12 shows the workstation housing having male fastening elements 201 secured by means of adhesive to the portable workstation housing, ready for attachment of the computer and printer. FIG. 10 shows the bottom of the computer, having female fastening elements 204 secured by means of adhesive to the computer base, ready for attachment to the housing of FIG. 12. Referring to FIG. 10, the battery compartment opening 508 of the computer is framed by, but not covered by, the VELCRO positioning elements. Clearly, alternately sized computers, having differently placed battery openings, could be provided with female fasteners 204 in alternative configurations.

As seen in particular in FIGS. 7a, 7b and 8, VELCRO cord wraps 280 can be placed in any location in the portable workstation housing to allow the user to secure data and power cables and cords 507 in a safe and organized manner. The cord wraps 280 generally provide a patch 281 and an elongate strip 282. The patch is secured to any advantageous portion of the workstation housing in a non-permanent manner by means of adhesive. The elongate strip 282 is removably attachable to the patch 281, and provides a covering of female VELCRO 283 on one side and male VELCRO 284 on the other. In operation, one end of the elongate strip 282 is wrapped around the cables and back on itself with the female material on the outside. The wrapped bundle is then attached to the male VELCRO patch 281 which was mounted previously within the case. FIG. 7a shows an elongate strip 282 having a covering of female VELCRO 283 on one side and male VELCRO 284 on the other side in an extended position, prior to being wrapped about a bundled power or data cable. FIG. 7b shows a cord wrap 280 securing a folded power cord.

As seen in FIG. 1, VELCRO fasteners 400 are used to support and constrain nonfolded or coiled cables against the lid, base or spine of the computer housing.

As seen in FIG. 2, a vertically adjustable computer support surface 360 allows the user to adjust the altitude of the computer. A computer support surface 361 is sized to support a computer, and may be moved manually upward, causing movement by scissor supports 362 about pivots 365 and by the lower ends of the scissors along lower adjustment tract 363. Locks 364 allow the user to prevent movement by the scissors along the tracks, thereby fixing the altitude of the computer. VELCRO pads 366 keep the computer in place on top of the support surface. VELCRO pads 367 carried by the support surface 360 attach to corresponding VELCRO pads on the base 120.

As seen in in FIG. 15, a cellular telephone may be supported by the inner surface of the lid by means cellular telephone fastening means 330. In the preferred embodiment of the computer housing, a single VELCRO fastener, attached to the phone and to the workstation housing allows the user to position the telephone. In other embodiments, VELCRO or similar releasable fastening elements are used to attach the antenna, the telephone body and the data cord to the lid. If desired, the data cord may be routed to the modem, where it is attached.

As seen in FIG. 5, a Kensington® or similar type of security slot 320 may be provided by the computer housing of the invention. Such security slots are commonly used by computer manufacturers to allow users to secure computers and occasionally peripheral devices to cables having devices which may be inserted into the slots. In the preferred embodiment of the invention, the security slot would allow the user to attach the entire computer housing to a security cable. When the computer housing was in the closed position seen in FIGS. 4 and 5, it could be locked. In this manner, a single security cable could be used to protect the housing, the computer, and all peripherals and cables. In the preferred embodiment, the Kensington® slot would be located in the spine brace 171 or 172, or sidewall 152, 153, thereby allowing the housing to be opened or closed or stood on end (the spine brace) without the need to disengage the cable from the Kensington slot. The workstation housing would typically provide a metal insert carried by the plastic spine brace or sidewall, thereby enhancing the rigidity and integrity of the case.

Further security structures optionally incorporated into some versions of the invention would apply known locks and security alarms. Known locking mechanisms are provided to prevent the case from being opened by unauthorized people. Also, in one version of the invention, a security alarm using known technology and having an audible alarm provides sensors attached to the body panels, hinges and locks of the portable workstation housing. Optionally, a motion sensor could detect violent motion. When the workstation housing was tampered with, a piercing alarm would result.

Figures 13, 14:
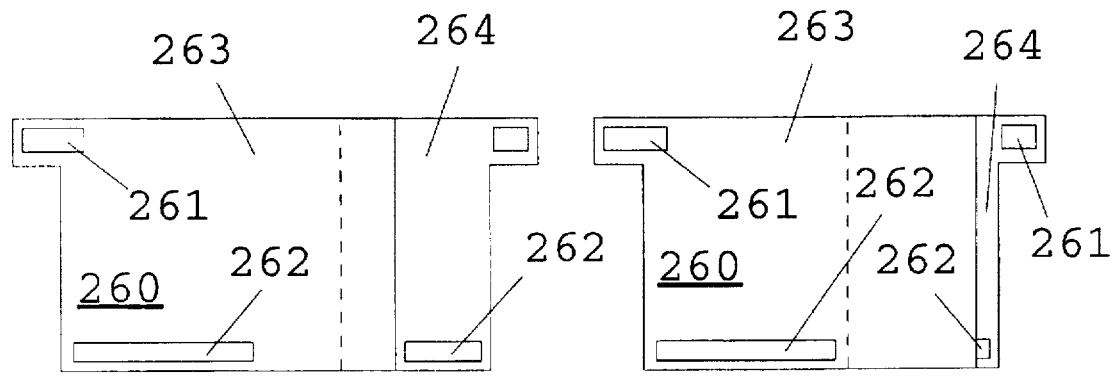
FIG. 13 is an orthographic view of the file pocket typically installed by VELCRO to the inside surface of the lid, in its extended configuration for legal-sized file folders.
FIG. 14 is an orthographic view of the file pocket typically installed by VELCRO to the inside surface of the lid, in its shortened configuration for letter-sized file folders.

A file pocket 260 is adjustable to accept either regular and legal sides files folders. As seen in FIGS. 13 and 14, the file pocket is provides two, overlapping sheets. In a typical version of the invention, an outside sheet 263 remains fixed in position by upper and lower VELCRO tabs 261, 262. An inside telescoping sheet 264 may be adjusted to accommodate letter and legal sized folders by movement of VELCRO attachment tabs 261, 262 between either of two sets of corresponding attachment tabs carried by the inside surface of the lid. As seen in FIG. 14, when attached to a first set of narrowly spaced tabs carried by the inside surface of the lid 140, the file pocket is sized to accept file folders for standard 8.5 by 11 inch paper. As seen in FIG. 13, when attached to a second set of more widely spaced tabs carried by the lid, the file pocket is sized to accept legal file folders, and the overlap between the two sheets 263, 264 is less. Optionally, accordion side elements allow the pocket 260 to expand somewhat when the pocket is filed. A computer disk pocket 265 may be carried by the file pocket 260.

As seen in FIG. 1, in the preferred embodiment a battery powered snake light 340 is carried by the upper right hand corner of the inside surface of the lid. The snake light provides a movable source of light, and can be used when alternative lighting is unavailable.

The portable workstation housing of the invention is used both to store and to transport a computer and associated peripheral devices. Moreover, the computer housing is particularly designed to allow the user to use the computer and peripherals while they are still carried by the housing. As a result, the user attaches cables as needed to all peripheral devices only during installation or reconfiguration.

Prior to first using the computer housing, the user should position all movable components, including the computer and all peripherals, including AC adapter(s) and the power strip, in a manner that is best suited to the sizes of the components and the space available. Once satisfied with the arrangement, the user should attach the adhesive sides of positioning elements 200 to the bottoms of the computer and peripherals and the corresponding locations on the inner surfaces 122, 141 of the lid and base. The VELCRO positioning elements may then be mated, holding the computer components in position. Cord wraps 280 are then wrapped about folded power and data cords. VELCRO fasteners 400 may then be used to prevent unwanted movement of non-bundled cords.

The previously described versions of the present invention have many advantages, including a novel portable workstation housing that provides adjustable positioning means to hold in place a computer, a printer or other peripheral, data and power cables, and other devices in a manner that may be altered to conform to the exact dimensions of the items carried by the housing, and that may be altered to the preferences of a left- or right-handed user.

Another advantage of the present invention is to provide a portable workstation housing that provides a power strip having the advantages of multiple electrical outlets, an on-off switch, a surge suppressor and a retractable electric power cord that extends and retracts by means of a spring-loaded mechanism.

Another advantage of the present invention is to provide a portable workstation housing that provides a battery operated snake light built into the case, typically on the lid, thereby providing a source of light when external sources of light are not available.

Another advantage of the present invention is to provide a portable workstation housing that provides cable organizing means for wrapping the power and data cables in a manner that ensures neatness and organization, Another advantage of the present invention is to provide a portable workstation housing having a lid that may be opened to any angle between 0 and 180 degrees, having a hinge that is stiff enough to allow the lid to be maintained in that angle.

A still further advantage of the present invention is to provide a portable workstation housing that provides a lid support, for use where the lid is opened to 180 degrees to prevent the case from tipping.

Although the present invention has been described in considerable detail and with reference to certain preferred versions, other versions are possible. For example, it is intended that the portable workstation housing of the invention be customizable for each individual user's specific situation. Moreover, it is intended that the portable workstation housing of the invention be modifiable by each user as the user's circumstances and equipment changes. Therefore, the examples given and the drawings shown are representative of specific configurations that are thought to be the preferred embodiment. However, it is to be realized that the preferred embodiment for any individual user will depend on the exact computer and peripheral equipment owned, the dimensions of that equipment and preferences of the user. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A portable workstation housing, for use in storing and operating a portable computer, during travel and during operation, comprising:
   (a) a planar base;
   (b) a spine, attached at right angles to the base;
   (c) a lid, hingably carried by the spine, having two opposed sidewalls and a top surface perpendicular to the sidewalls;
   (d) frictional means for maintaining the position of the lid with respect to the base at any angle from 0 to 180 degrees;
   (e) positioning means for holding the computer rigidly against the base;
   (f) cable organizing means, carried by the housing, for constraining a folded cable to remain in a folded position.

2. The portable workstation housing of claim 1, further comprising a vertically adjustable computer support surface, carried by the base, comprising:
   (a) an adjustment track, carried by the base;
   (b) scissor supports, slideably carried by the adjustment track;
   (c) a computer support surface, attached to the scissor supports by pivoting means; and
   (d) VELCRO pads, carried by the computer support surface for releasable attachment to the computer.

3. The portable workstation housing of claim 1, further comprising locking means to secure the housing.

4. The portable workstation housing of claim 3, further comprising means to electrically recharge the computer while the housing is locked.

5. The portable workstation housing of claim 1, further comprising:
   (a) sensor means attached to the housing for detecting unauthorized tampering; and
   (b) alarm means, attached to the sensor means, for sounding an audio alarm in response to tampering.

6. The portable workstation housing of claim 1, further comprising:
   (a) security slot means attached to the housing for attaching to a security cable.

7. The portable workstation housing of claim 1, additionally comprising a power strip comprising:
   (a) a plurality of outlets;
   (b) a surge suppressor, electrically connected to the outlets;
   (c) retractable power cable device means for extending a power plug and cord sufficiently so that it may be plugged into a wall outlet and for retracting the power plug and cord so that it may be stored within the device; and
   (d) an on-off switch.

8. The portable workstation housing of claim 1, wherein the cable organizing means comprises a wrap attached to the computer housing, having a first side and a second side, the first side having a covering of a first sex of fastener and the second side having a covering of a second sex of fastener, whereby a folded cable may be wrapped inside a loop formed by attaching the first side of the wrap to the second side of the wrap.

9. The portable workstation housing of claim 1, wherein the frictional means for maintaining the position of the lid comprises left and right arc shaped locking elements, each locking element carried between the spine and one of the opposed sidewalls.

10. The portable workstation housing of claim 1, further comprising lid support means, carried by the lid, comprising a leg pivotable between a first position adjacent to the lid and a second position perpendicular to the lid, for supporting the lid when the lid is in the fully open position.

11. The portable workstation housing of claim 1, in which the positioning means comprises:
   (a) a first fastening strip, having a first side and a second side, wherein there is a covering of a first sex of fastening material on the first side and wherein the strip is attached to the computer housing by means of an adhesive covering on the second side; and
   (b) a second strip of fastening material, having a first side and a second side, wherein there is a covering of a second sex of fastening material on the first side of the second strip, the first side being releasably engageable with the first sex of fastening material on the first fastening strip and wherein the second strip is attached to the computer by means of an adhesive covering on the second side.

12. The portable workstation housing of claim 1, additionally comprising a file pocket, comprising:
   (a) an outside sheet, having upper and lower VELCRO attachment tabs, carried by the lid; and
   (b) an inner telescoping sheet, having upper and lower VELCRO attachment tabs, carried by the lid, adjustable between a first position wherein the file pocket is sized appropriately for letter sized files and a second position wherein the file pocket is sized appropriately for legal sized files.

13. The portable workstation housing of claim 1, further comprising means for supporting a cellular telephone to the lid.

14. A portable workstation housing, for use in storing and operating a portable computer and a computer peripheral device, during travel and during operation, comprising:
   (a) a planar base having a peripheral groove;
   (b) a mouse pad, attached to the base;
   (c) a spine, attached at right angles to the base;
   (d) a spine brace attached to each end of the spine and to the base;
   (e) a lid, hingably carried by the spine, having two opposed sidewalls and a top surface perpendicular to the sidewalls, the top having a handle, the sidewalls and the top having a tongue to releasably mate with the groove of the base;

(f) lid support means, carried by the lid, and movable between a first position adjacent to the lid and a second position perpendicular to the lid, for supporting the lid when the lid is in the fully open position;

(g) a detachable shoulder strap carried by the opposed sidewalls;

(h) locking means for maintaining the position of the lid with respect to the base at any angle from 0 to 180 degrees, comprising left and right arc shaped locking elements, each locking element carried between the spine and one of the opposed sidewalls;

(i) positioning means for holding the computer rigidly against the base, comprising:
 (a) a first fastening strip, having a first side and a second side, wherein there is a covering of a first sex of fastening material on the first side and wherein the strip is attached to the base by means of an adhesive covering on the second side; and
 (b) a second strip of fastening material, having a first side and a second side, wherein there is a covering of a second sex of fastening material on the first side of the second strip, the first side being releasably engageable with the first sex of fastening material on the first fastening strip and wherein the second strip is attached to the computer by means of an adhesive covering on the second side;

(j) cable organizing means, carried by the housing, for constraining a folded cable to remain in a folded position, comprising a wrap, having a first side and a second side, the first side having a covering of a first sex of fastener and the second side having a covering of a second sex of fastener, whereby a folded cable may be wrapped inside a loop formed by attaching the first side of the wrap to the second side of the wrap;

(k) a file pocket, carried by the lid, for storage of paper file folders, comprising:
 (a) an outside sheet, having upper and lower VELCRO attachment tabs, carried by the lid; and
 (b) an inner telescoping sheet, having upper and lower VELCRO attachment tabs, carried by the lid, adjustable between a first position wherein the file pocket is sized appropriately for letter sized files and a second position wherein the file pocket is sized appropriately for legal sized files;

(l) cellular telephone support means for releasably attaching the cellular telephone to the lid;

(m) a power strip, carried by the housing, comprising:
 (a) a plurality of outlets;
 (b) a surge suppressor, electrically connected to the outlets;
 (c) retractable power cable device means for extending a power plug and cord sufficiently so that it may be plugged into a wall outlet and for retracting the power plug and cord so that it may be stored within the device;
 (d) a plurality of interconnected telephone jacks; and
 (e) an on-off switch;

(n) a battery powered snake light, carried by the lid;

(o) security slot means in the housing for attachment to a standard security cable; and (p) a vertically adjustable computer support surface, carried by the base, comprising:
 (a) an adjustment track, attached to the base by means of VELCRO pads;
 (b) scissor supports, slideably carried by the adjustment track;
 (c) a computer support surface, attached to the scissor supports by pivoting means; and
 (d) VELCRO pads, carried by the computer support surface for releasable attachment to the computer.

* * * * *